United States Patent
Articolo

(10) Patent No.: US 9,920,904 B2
(45) Date of Patent: Mar. 20, 2018

(54) CRITICAL ANGLE LENS REFLECTOR

(71) Applicant: George A. Articolo, Marlton, NJ (US)

(72) Inventor: George A. Articolo, Marlton, NJ (US)

(*) Notice: Subject to any disclaimer, the term of this patent is extended or adjusted under 35 U.S.C. 154(b) by 184 days.

(21) Appl. No.: 14/960,765

(22) Filed: Dec. 7, 2015

(65) Prior Publication Data

US 2017/0159909 A1    Jun. 8, 2017

(51) Int. Cl.
| | |
|---|---|
| *F21V 13/04* | (2006.01) |
| *F21V 7/00* | (2006.01) |
| *F21V 7/04* | (2006.01) |
| *G02B 5/02* | (2006.01) |
| *F21S 8/10* | (2006.01) |

(52) U.S. Cl.
CPC .......... *F21V 7/0091* (2013.01); *F21S 41/285* (2018.01); *F21S 41/321* (2018.01); *F21S 41/322* (2018.01); *F21S 41/336* (2018.01); *F21S 48/1225* (2013.01); *F21S 48/137* (2013.01); *F21S 48/1323* (2013.01); *F21S 48/1329* (2013.01); *F21V 7/04* (2013.01); *G02B 5/021* (2013.01); *G02B 5/0278* (2013.01)

(58) Field of Classification Search
CPC ....... F21V 7/0091; G02B 5/0278; F21S 48/00
See application file for complete search history.

(56) References Cited

U.S. PATENT DOCUMENTS

| | | | |
|---|---|---|---|
| 2004/0070989 A1* | 4/2004 | Amano | F21S 48/215 362/520 |
| 2010/0085764 A1* | 4/2010 | Chuang | F21S 6/005 362/327 |
| 2010/0142048 A1* | 6/2010 | Chou | F21V 9/14 359/485.02 |
| 2010/0214764 A1* | 8/2010 | Chaves | G02B 6/0096 362/84 |
| 2011/0157898 A1* | 6/2011 | Kanai | F21V 5/04 362/296.05 |
| 2013/0208495 A1* | 8/2013 | Dau | F21V 7/0008 362/551 |
| 2014/0268758 A1* | 9/2014 | Morgan | F21V 7/0091 362/237 |

\* cited by examiner

*Primary Examiner* — Alexander Garlen
*Assistant Examiner* — Eric T Eide

(57) ABSTRACT

A critical angle lens reflector includes a solid, lens shaped object that is fabricated from a visibly transparent material such as glass, plastic, silicone or epoxy. A surface of the reflector has a geometric profile with a two-dimensional cross section curve in which coordinate points (x,y) on the curve have values defined by the mathematical equation $$dy/dx=(y-x\,\tan(90-\varphi))/(y\,\tan(90-\varphi)+x),$$

in which φ is a predetermined incident angle that is chosen to have a magnitude such that light output, from the light source housed within an illumination device, will undergo total internal reflection upon reflection off the interior surface of the lens reflector.

17 Claims, 4 Drawing Sheets

CRITICAL ANGLE LENS REFLECTOR

FIELD OF THE INVENTION

This invention is directed to a light device having a critical angle lens reflector that provides for an efficient output of light to an exterior of the light device.

BACKGROUND OF THE INVENTION

Typical lighting reflection devices found in flashlights, automobile headlamps, architectural, industrial and home lighting fixtures, contain a light source coupled with an ordinary mirrored reflector. The purpose of the ordinary mirrored reflector is to redirect the backward emission light into a forward direction so as to enhance the outward brightness of the device, thus increasing its efficiency.

Typical ordinary mirrored reflectors used in these devices are fabricated from a curved plastic or metal surface that has a deposited silver film that acts as a mirror so as to redirect the backward emission light in a forward direction. The light source is generally energized by electricity (battery or power source). During a typical operation, the ordinary reflector receives the backward light, absorbs heat from the light, and then reflects only a portion of the light energy. This absorbed energy in the ordinary reflector material is cause for the reflector getting hot and experiencing a detrimental deterioration. In addition, since the ordinary reflector absorbs some of the energy, the overall reflective efficiency of the device is compromised. Thus, ordinary reflectors are inefficient for two reasons: 1) there is a reduction in reflective efficiency, and 2) the absorbed energy is cause for heat buildup and material deterioration. In the case of architectural situations, this heat buildup is cause for lighting fixtures getting hot; thus, putting a drain on air conditioning requirements and creating a host of residual difficulties.

DETAILED DESCRIPTION

Figure 1:
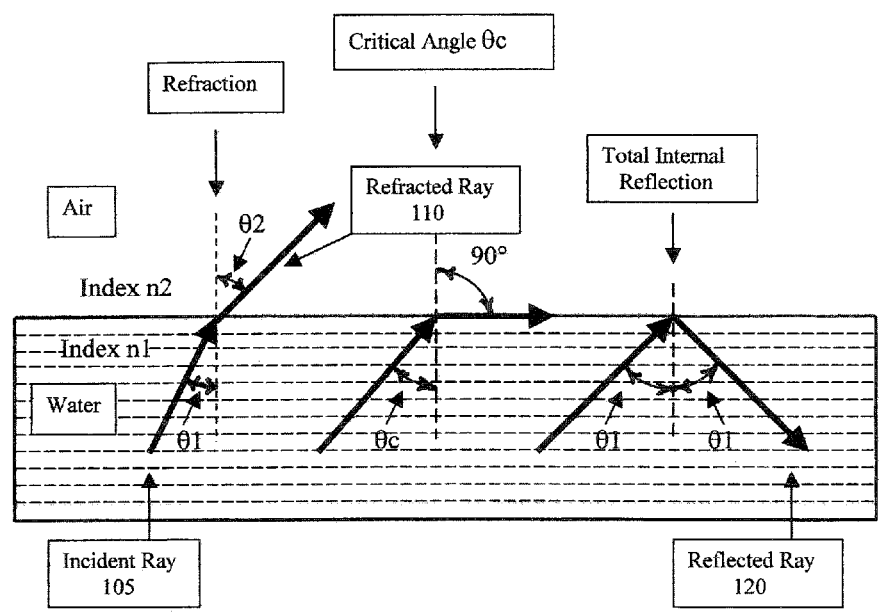
FIG. 1 illustrates Snell's law showing light rays emanating from within a medium of index of refraction n1 and hitting an interface with a medium of index of refraction n2, whereby n1>n2.

At least one embodiment is directed to a critical angle lens reflector that has commercial applications that supersede ordinary mirrored reflectors. Critical angle reflection is based upon the optics-physics principle of total internal reflection (TIR). Total internal reflection of light rays is characterized by two basic principles: (1) the light rays are reflected off of the reflecting surface whereby the angle of reflection—with respect to the perpendicular to the reflecting surface—is equal to the angle of incidence of the ray, and (2) the reflection of the light ray takes place with no loss of energy upon reflection. Total internal reflection is an advantageous condition for the reflection of light because it is reflection without energy or heat loss—it is the most efficient means of reflecting light. Total internal reflection has practical applications in the prism reflectors that are used in binoculars and field glasses. In some embodiments, the critical angle lens reflector is a solid, lens shaped object that is fabricated from a visibly transparent material such as glass, plastic, silicone or epoxy. The reflector typically is used in a practical application in a surrounding transparent medium—such as in air, liquid, solid or gas.

One feature for at least one embodiment is a uniquely defined geometrical profile of a lens shaped reflecting surface of a reflector. This lens shaped surface has that particular geometrical profile such that light rays—emanating from an interior light source—strike the interior reflector surface with a preferred, fixed incident angle having a magnitude that is larger than the optical critical angle. From the basic principles of geometrical optics in physics, the optical critical angle is that particular angle, whereby incident light rays that strike the reflecting surface with an incident angle that is larger than the critical angle will undergo total internal reflection.

In one or more embodiments, the lens reflector is a lens shaped, solid, molded object that could be fabricated or formed from a clear epoxy, or a clear plastic, or a clear glass. As shown in the figures, the fabrication mold would provide an open receptacle portion where the interior light source would be embedded in a fixed position. The interior light source may be a light emitting diode, LED, and/or a compact fluorescent bulb, CFL, or any other suitable source of light. The embedded light source would be mounted within the open receptacle portion of the lens reflector and it would have intimate luminous contact with the lens reflector such that the light output from the light source would immediately enter into the reflector lens.

Ordinary silver-mirrored surface type reflectors, such as ones found in typical flashlights, automobile headlamps, residential and architectural lighting fixtures, reflect light adhering to the same above principle whereby the angle of reflection is equal to the angle of incidence. However, compared to total internal reflection, there is distinct difference here in that there is a loss of light energy during the reflection process. This light energy loss is manifest in the absorption of heat energy in the reflecting surface, whereby the reflecting surface gets hot, which can result in deterioration of the lighting fixture containing the reflecting surface. Ordinary reflectors are energy absorbing devices that diminish reflecting power and generate unwanted residual heat loss. As such, they are not energy efficient and put a drain on air conditioning resources. In at least one embodiment, reflectivity based upon total internal reflection produces an advantageous reflector with enhanced reflecting capabilities. The critical angle lens reflector according to at least one embodiment utilizes total internal reflection as an efficient means of reflecting light without the detrimental residual heat and energy loss, and thereby provides for beneficial attributes in commercial and residential lighting and fiber optic applications.

At least one embodiment is directed to a critical angle lens reflector that utilizes reflectivity based upon total internal reflection of the backward emitted light. By utilizing such a reflector, 100% reflectivity of the backward light emission is obtained with no attendant loss of light energy and no absorption of heat energy. Overall lighting efficiency is enhanced and energy efficiency is enhanced because of the elimination of the detrimental effects of heat absorption in the reflector material.

Total internal reflection is based upon critical angle reflectivity. The optics-physics behind critical angle reflectivity is incorporated in Snell's law. The diagram shown in FIG. 1 shows a light ray incident upon a water-air interface system.

In more detail, FIG. 1 illustrates Snell's law, showing light rays emanating from within a medium of index of refraction n1 and hitting an interface (i.e., incident ray 105) with a medium of index of refraction n2, whereby n1>n2. Light rays are shown refracted into medium n2 (i.e., refracted ray 110) until the refracted angle reaches 90 degrees. At this point, the incident angle in medium 1 is called the "critical angle" and all light rays with an incident angle greater than this critical angle will be totally internally reflected (i.e., reflected ray 120). In accordance with the geometrical optics law of reflection, the reflected ray angle will be equal to the incident ray angle.

The index of refraction of the water is n1 and the index of refraction of the air is n2 where, for total internal reflection, n1>n2. The incident ray makes an incident angle θ1 with the vertical (normal line) and the refracted ray makes a refracted angle θ2 with the vertical (normal line). Snell's law, given below, $$n1\ \sin(\theta1) = n2\ \sin(\theta2)$$

shows the connection between the incident and refracted angles and the corresponding indices of refraction of the two media in the system—n1 for water and n2 for air where n1>n2. As the incident angle is increased, then, for the case where n1>n2, the refracted angle θ2 approaches 90 degrees. At the point where angle θ2 is equal to 90 degrees, there is no longer a refracted ray that crosses the boundary interface into the air medium, and the corresponding incident angle in medium 1 is called the "critical angle", denoted as θc. Mathematically, at θ2=90 degrees, since sin (90°)=1, then from Snell's law, the magnitude of the critical angle is given by $$\theta c = \arcsin(n2/n1)$$

Typical values of indices of refraction for various materials—measured in the visible light range—are given below.
Air: 1.000, Water: 1.333 Plastic (e.g., Lucite): 1.500
Crown Glass: 1.520
Some typical values of critical angles for various material interfaces for n1>n2 are given below:
For a water-air interface, n1=1.333, n2=1.000, θc=arcsin(1/1.333)=48.6 degrees
For a Lucite-water interface, n1=1.500, n2=1.333, θc=arcsin (1.333/1.5)=62.7 degrees
For a Lucite-air interface, n1=1.500, n2=1.000, θc=arcsin (1/1.500)=41.8 degrees One feature of at least one embodiment is that the lens shape of the reflector surface has a particular geometrical profile to cause total internal reflection of light incident thereon. The particular geometrical profile forces the condition that light rays emanating from an interior light source (e.g., LED or CFL) housed within an illumination device (e.g., a headlamp or flashlight) contact the interior surface interface with a preferred, fixed incident angle that is larger than the critical angle of the system as defined by the two component materials at the interface. The preferred cross-section geometrical profile of the lens shaped surface has the shape of a curve having coordinate points (x,y) that are determined by the mathematical equation shown below $$dy/dx = (y - x\ \tan(90-\varphi))/(y\ \tan(90-\varphi)) + x)$$

This equation is valid over the two dimensional domain x>0, y≥0. In this equation, (x,y) are the coordinate points on the geometrical profile curve, dy/dx is the slope (derivative) of the curve and φ is the preferred, fixed angle of incidence of the light ray emanating from the light source. The three-dimensional profile of the preferred reflecting surface is obtained by a mapping (or revolution) of this two-dimensional curve about the symmetry y-axis.

In an implementation of this equation in a practical application, the value of the preferred, fixed angle of incidence φ is determined in order to achieve total internal reflection of the light rays. For example, this angle is determined by the material from which the lens is fabricated (e.g., clear Lucite plastic) and the medium which surrounds the lens (e.g., air or water).

As an example, a practical system interface is chosen whereby the lens reflector material is clear Lucite plastic and the surrounding medium is air. From the above calculation for this particular system, the critical angle is determined to be 41.8 degrees. Therefore, to get total internal reflection, the preferred, fixed incident angle must be larger than 41.8 degrees. Thus, to choose a larger angle, the preferred, fixed incident angle can be chosen to have the magnitude φ=45 degrees.

For this example—using the above generalized mathematical equation for the special case of the preferred fixed incident angle having the value φ=45 degrees—the resulting preferred two dimensional geometrical profile configuration curve of the surface of the reflector has geometrical coordinate points (x,y) that satisfy the simplified mathematical equation given below for x>0, y≥0.

$$dy/dx = (y-x)/(y+x) \quad\quad \text{Equation 1}$$

Figure 2:
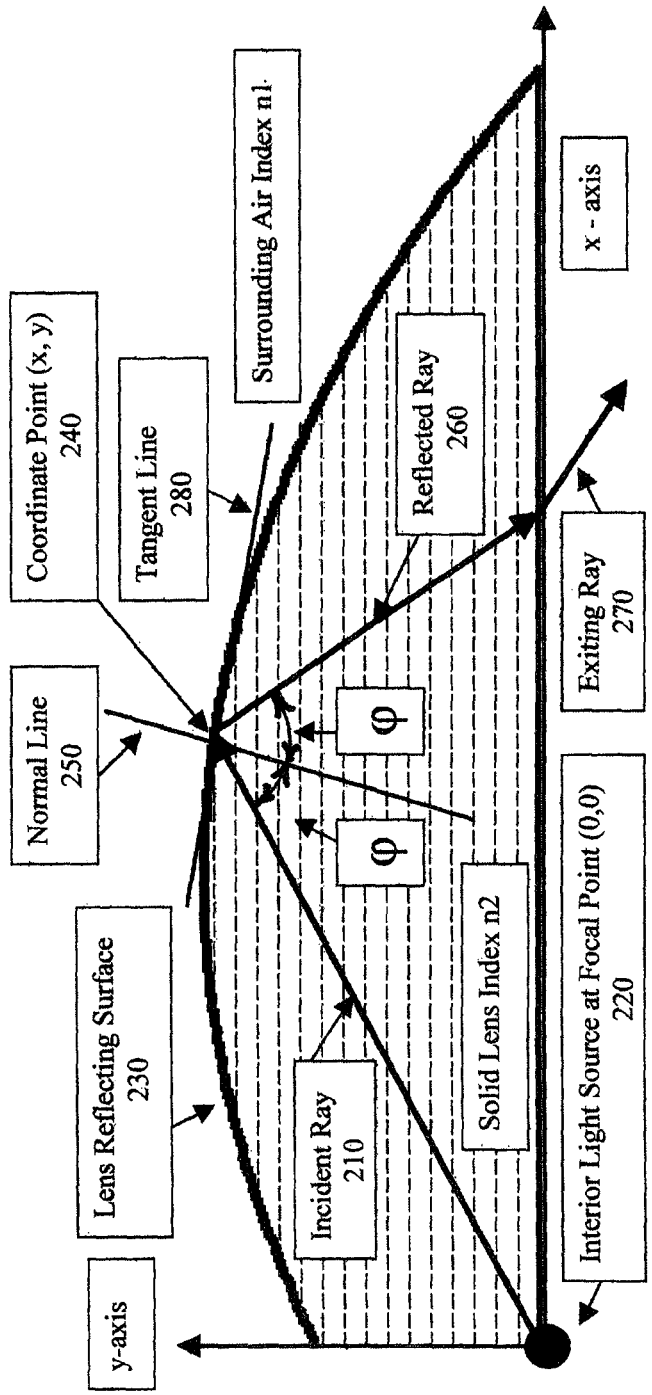
FIG. 2 shows the two-dimensional cross section profile curve of the solid lens shaped upper surface of a reflector according to a first embodiment over a two dimensional domain $x>0$, $y \geq 0$.

This simplified mathematical equation is of the form of a differential equation that has a unique solution for the given boundary condition y(0)=1. FIG. 2 shows the two-dimensional solution curve 230 to this equation in the region x>0, y≥0. A single ray 210 from the coordinate origin (0,0) (where an interior light source 220 is located) is shown, whereby the ray 210 hits the surface profile curve 230 at a particular coordinate point 240. The tangent line 280 and the normal (perpendicular) line 250 to the curve 230 are shown at this particular point 240. At this interception point 240, the ray 210 from the origin 220 makes an incident angle of φ=45 degrees with respect to the normal line 250 to the curve 230 at this point 240, whereby this is the exact forced preferred condition for causing total internal reflection of the ray 210.

In more detail, FIG. 2 shows the two-dimensional cross section profile curve of a solid lens shaped upper surface 230 of a reflector according to a first embodiment over the two dimensional domain x>0, y≥0. A single ray, indicated by the "incident ray" 210 emanating from an interior light source 220 at the focal point at the coordinate origin (0,0), is shown hitting the interior reflector curve 230 and then undergoing total internal reflection, as indicated by the "reflected ray" 260. The tangent line 280 and the normal line 250 to the curve 230 at this point 240 are shown. The preferred, fixed angle of incidence of the incident ray 210, with respect to the normal line 250 to the curve 230 at this point 240, is indicated by the symbol φ. In accordance with the law of reflection in geometrical optics-physics, the reflected ray 260 makes a reflected angle φ that is equal in magnitude to the incident ray angle φ. After being reflected off the curved upper surface 230 of the reflector, the reflected ray 260 becomes incident on the flat bottom surface of the reflector, and, since the incident angle is less than the critical angle, the reflected ray 260 is refracted out of the reflector as an "exiting ray" 270.

All light rays emanating from the coordinate origin point (0,0) will make a preferred, fixed incident angle of φ=45 degrees with respect to the normal line 250 to the curve 230 at all interception points on the curved upper surface 230 of the reflector. Thus, all these rays incident on the curved upper surface 230 of the reflector will undergo total internal reflection at their corresponding interception points. In accordance with the law of reflection in geometrical optics, upon reflection, the reflection ray angle φ of the reflected ray 260 will equal the incidence ray angle φ of the incident ray 210 as shown in FIG. 2. The mapping (or revolution) of this two-dimensional curve about the symmetry y-axis generates the preferred three-dimensional geometrical profile of the lens shaped curved upper reflecting surface of the reflector, the cross section of which is shown in FIG. 3 as curve 300.

Figure 3:
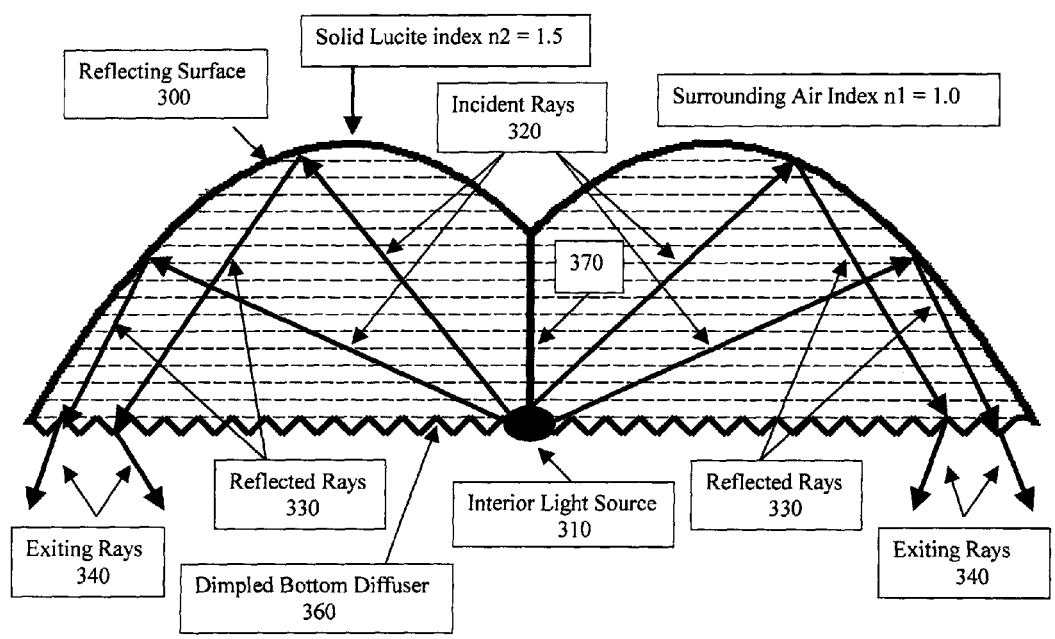
FIG. 3 depicts the two-dimensional cross section curve of the three-dimensional surface of a solid lens reflector according to the first embodiment over the two dimensional domain $0<x<0$, $y \geq 0$.

In more detail, FIG. 3 depicts the two-dimensional cross section curve 300 of the three-dimensional surface of a solid lens reflector according to the first embodiment over the two dimensional domain 0<x<0, y≥0. The coordinate points (x,y) on this curve 300 are defined by the above mathematical equation 1. An interior light source 310 is shown along the vertical symmetry y-axis. Rays 320 from this light source 310 undergo total internal reflection upon incidence at the interior reflector surface 300. These rays 320 are then reflected downward, as reflected rays 330, to the bottom surface of the lens and are then exited from the bottom, as exiting rays 340. Upon exiting, these rays are refracted in accordance to Snell's law. The bottom solid surface 360 of the lens is shown with a flat surface that has a half-spherical dimpled texture that promotes random diffusion of the light rays exiting from the bottom and thereby out of the lighting device to light a particular area (e.g., an area in front of a headlamp of a vehicle traveling on a road, to thereby illuminate that area).

One possible implementation of the first embodiment utilizes a solid three-dimensional lens shaped surface, having a cross section curve 300 of which is shown in FIG. 3 for such a solid three-dimensional lens shaped surface. All rays emanating from the interior light source 310 at the focal point, or the origin point x=0, y=0, satisfy the condition that all incident rays 320 striking the interior of the surface 300 make a preferred, fixed incident angle of φ=45 degrees with respect to the normal (perpendicular) to the surface 300. In addition, FIG. 3 shows an extension 370 of the interior light source along the y-axis for vertical points x=0, y≥0 upwards to the normalized height of the reflecting surface. All the light rays emanating from this vertical interior light source along this axis 370 will make an incident angle greater than 45 degrees at the reflecting surface 300. Thus, all light rays from this interior light source will be totally internally reflected at the interior-reflecting surface 300. As shown in FIG. 3, these rays will then be directed downward towards the bottom surface 360 of the lens and will then exit the lens. Upon exiting the bottom surface of the lens into the surrounding medium, these rays will undergo refraction as determined by Snell's law.

To enhance the randomness of the angles of the exiting rays from the bottom surface of the lens, the bottom surface can be made to have the texture of a uniform array of contiguous, half-spherical dimples. In at least one embodiment, the bottom surface of the lens reflector is flat with a circular periphery. As part of the fabrication mold, the bottom surface would be molded as a circular, uniform array of contiguous, half spherical dimples, the diameters of which could be on the order of 0.50 mm to 5 mm per dimple.

Figure 4:
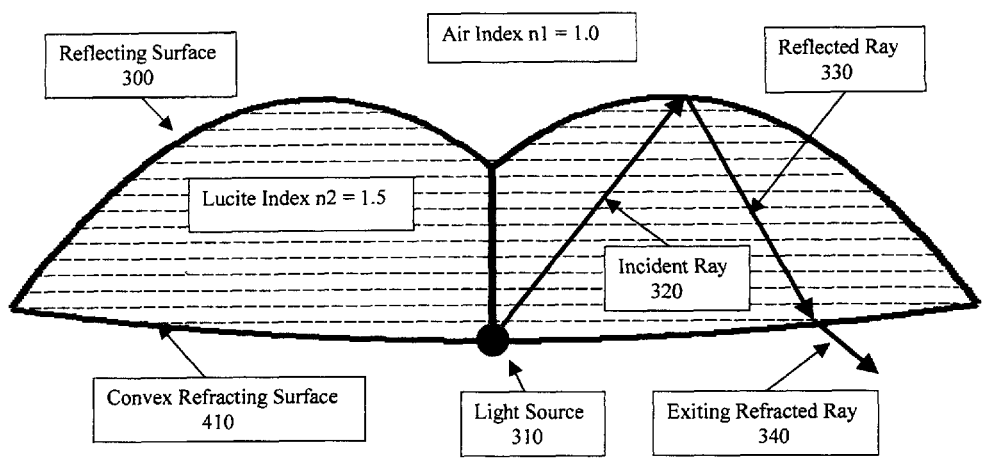
FIG. 4A shows a convex-shaped bottom surface of the two-dimensional cross section curve of the surface of a solid lens reflector according to a second embodiment over the two dimensional domain $0<x<0$, $y \geq 0$.
FIG. 4B show a concave shaped bottom surface of the two-dimensional cross section curve of the surface of a solid lens reflector according to an alternate configuration of the second embodiment over the two dimensional domain $0<x<0$, $y \geq 0$.
Figure 4:
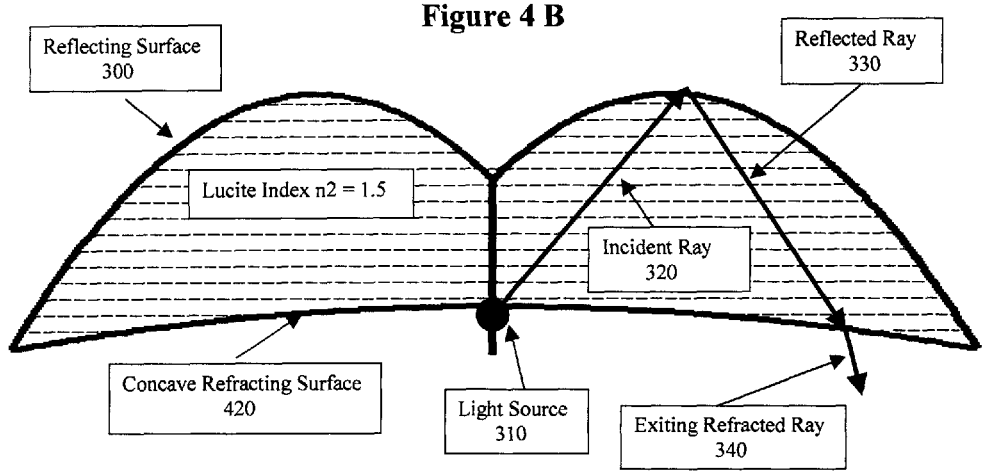

FIGS. 4A and 4B respectively show two alternative shaped bottom surfaces, convex and concave, of a two-dimensional cross section curve of the surface of a solid lens reflector according to a second embodiment over the two dimensional domain 0<x<0, y≥0. A convex shaped bottom surface 410 is shown in FIG. 4A, and a concave shaped surface 420 is shown in FIG. 4B. The non-flat profile of the bottom surface having such a convex or concave shape is utilized so as to further control the focus array, converging or diverging, of the refracted rays 340 exiting from that non-flat surface 410, 420. In more detail, light output from a light source 310 contacts the reflecting surface 300 of the lens as incident rays 320, and are reflected, as reflected rays 330, towards the bottom surface of the lens, whereby those reflected rays 330 exit from the bottom surface 410, 420 of the lens (and into an exterior region of the illumination device housing the lens and the light source) as refracted rays 340.

A lens utilized in at least one embodiment may be a solid, lens shaped object that is fabricated from a visibly transparent material that has an index of refraction that is larger than that of the surrounding medium. The upper surface of the lens has the preferred geometrical profile configuration defined by a mathematical equation that forces the condition that all incident light rays emanating from the interior light source along the y-axis will, upon striking the internal upper surface of the lens, undergo total internal reflection. The purpose for achieving this condition relies upon the optics-physics principle that total internal reflection—versus ordinary reflection off of a mirrored surface—is the most efficient means of reflecting light. Total internal reflection is 100% efficient in reflectivity of light and is energy lossless; thus, the detrimental effects of heat buildup—as is the case in an ordinary reflector surface—has been eliminated or, at the very least, greatly reduced. Heat buildup is cause for the ordinary reflector surface to get hot; thus, putting a drain on air-conditioning resources.

Particular embodiments of the subject matter have been described. Other embodiments are within the scope of the following claims.

What is claimed is:

1. An Illumination device, comprising:
   a light source; and
   a solid, lens shaped optical reflector having a first portion having a curvature to cause light output from the light source that becomes incident on the first portion of the reflector to undergo total internal reflection; and
   a second portion opposite the first portion and spaced apart from the second portion, the second portion corresponding to a light exiting portion of the illumination device, wherein the light rays that undergo total internal reflection at the first portion of the reflector exit the illumination device through the second portion and thereby into a region external to the illumination device, and
   wherein the second portion includes a plurality of half-spherical-shaped dimples that cause the light output to the environment external to the illumination device to cause random diffusion of the light output by the illumination device to the region external to the illumination device, and
   wherein a geometrical profile of a first surface of the reflector disposed behind the light source with respect to a light exiting portion of the illumination device, has a two-dimensional cross section curve in which coordinate points (x,y) on the curve have values defined by the mathematical equation $$\frac{dy}{dx} = \frac{y - x\tan(90 - \phi)}{y\tan(90 - \phi) + x}$$

wherein φ is a predetermined incident angle.

2. The illumination device according to claim 1, wherein the reflector comprises at least one of glass, plastic, silicone or epoxy.

3. The illumination device according to claim 2, wherein the reflector comprises a transparent material having an index of refraction that is larger than an index of refraction of a medium at an exterior of the illumination device.

4. The illumination device according to claim 1, wherein the light source is disposed within the illumination device such that rays emanating from the light source contact the reflector at the predetermined incident angle with respect to a normal line to a surface of the reflector.

5. The illumination device according to claim 4, wherein the predetermined incident angle has a magnitude that is greater than the critical angle determined by Snell's law.

6. The illumination device according to claim 1, wherein light rays emanating from the light source contact the reflector and undergo total interior reflection within an interior of the illumination device, so as to exit the illumination device via the light exiting portion of the illumination device.

7. The illumination device according to claim 1, wherein the region external to the illumination device comprises air or water.

8. A solid lens shaped optical reflector, comprising:
a first surface having a geometric profile with a two-dimensional cross section curve in which coordinate points (x,y) on the curve have values defined by the mathematical equation $$dy/dx = \frac{y - x\tan(90 - \phi)}{y\tan(90 - \phi) + x}$$

wherein φ is a predetermined incident angle;
a second surface opposite the first surface and spaced apart from the second surface, the second surface corresponding to a light exiting portion of the illumination device,
wherein the light rays that undergo total internal reflector within the interior of the illumination device exit the illumination device through the second surface and thereby into a region external to the reflector, and
wherein the second surface includes a plurality of half-spherical-shaped dimples that cause the light output to the region external to the reflector to cause random diffusion of the light output by the reflector to the region external to the reflector.

9. The reflector according to claim 8, wherein the reflector comprises at least one of glass, plastic, silicone or epoxy.

10. The reflector according to claim 9, wherein the reflector comprises a transparent material having an index of refraction that is larger than an index of refraction of a medium at an exterior of the reflector.

11. The reflector according to claim 8, wherein the light source is housed within an illumination device that also houses the reflector such that all light rays emanating from the light source contact the reflector at the predetermined incident angle with respect to a normal line to a surface of the reflector.

12. The reflector according to claim 11, wherein the predetermined incident angle φ has a magnitude that is greater than the critical angle determined by Snell's law.

13. The reflector according to claim 11, wherein the region external to the illumination device comprises air or water.

14. The illumination device according to claim 1, wherein the second portion comprises a concave-shaped surface.

15. The illumination device according to claim 1, wherein the second portion comprises a convex-shaped surface.

16. The reflector according to claim 1, wherein the second surface comprises a concave-shaped surface.

17. The reflector according to claim 1, wherein the second surface comprises a convex-shaped surface.

* * * * *